United States Patent Office 3,631,157
Patented Dec. 28, 1971

3,631,157
REACTIVE MIXED ANHYDRIDE-CONTAINING
POLYMERS AND A METHOD FOR THEIR
PREPARATION
Walter L. Vaughn, Angleton, Tex., assignor to The Dow
Chemical Company, Midland, Mich.
No Drawing. Filed Feb. 9, 1970, Ser. No. 11,363
Int. Cl. C08f 27/00
U.S. Cl. 260—78.5 T                          5 Claims

ABSTRACT OF THE DISCLOSURE

A composition of matter comprising polyalkylene copolymers which contain at least one acid anhydride group of the formula $$R-\overset{O}{\underset{\|}{C}}-O-\overset{O}{\underset{\|}{C}}-B$$

wherein R is alkyl, aryl, aralkyl, or the like, of up to about 20 carbon atoms, or a group of the formula

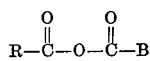

wherein R' and R" are the same type of substituents as R, so long as the group contains no more than about 20 total carbons, and B is a segment of the polyalkylene chain. These copolymers are prepared by treating an olefin-alkylene carboxylic acid copolymer, which contains at least one group of the formula $$HO-\overset{O}{\underset{\|}{C}}-B$$

wherein B is as defined above, with either a carboxylic acid halide or an organic ketene. The resulting polymers may then be cross-linked to form insoluble films and coatings, and, further, synergistically improve the performance of textile oil- and water-proofing agents.

BACKGROUND OF THE INVENTION

The various polymers utilized to prepare the copolymers of this invention are known to the art, generally being modified or non-modified olefin/acid or olefin/acid halide polymers. They may be prepared according to a number of U.S. patents, including 3,441,545, 2,268,169, 3,310,518, 3,361,842 and 3,413,272.

These acid or acid halide polymers are typically prepared by polymerizing an alpha olefin, such as ethylene and/or propylene, with an alpha,beta ethylenically unsaturated carboxylic acid, in the presence of a catalyst and under superatmospheric pressure. These polymers may then be modified to, for instance, acid halides, esters, amides and the like.

The prior art modified or non-modified polymers so made may be utilized as coating and film-forming materials. However, the polymers of the instant invention are far more reactive than the above prior art polymers, thereby giving them broader utility.

SUMMARY OF THE INVENTION

The invention comprises polyalkylene copolymers which contain at least one acid anhydride group of the formula

 (I)

wherein R is an alkyl, cycloalkyl, aryl, aralkyl, alkaryl, or like group, of up to about 20 carbon atoms, or a group of the formula

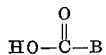 (II)

wherein R' and R" are, independently, the same type of substituents as R, so long as the group of Formula II contains no more than about 20 carbon atoms, and B is a segment of the polyalkylene chain.

The copolymers of this invention may be prepared by treating an olefin-carboxylic acid copolymer, which contains at least one group of the formula $$HO-\overset{O}{\underset{\|}{C}}-B \quad (III)$$

wherein B is as defined above, with either a carboxylic acid halide or an organic ketene.

The resulting polymers may then be cross-linked to form insoluble and tenacious films and coatings. Further, a synergism is observed with regard to the oil- and water-repellent properties of certain textile agents when combined with the copolymers of this invention.

The copolymers of this invention may suitably have a molecular weight of from about 800 to those of high polymers, i.e., in the millions, and preferably have a molecular weight of from about 1500 to about 500,000.

DETAILED DESCRIPTION OF THE INVENTION

The polyalkylene precursor polymers utilized in this invention may suitably be derived from monomers, or mixtures thereof, which are ethylenically unsaturated and polymerizable. These monomers are well known in the art and include such compounds as alkenes and alkadienes, such as ethylene, propylene, butene, isobutene, pentene, hexene, octene, butadiene, isoprene, etc. (the term alkenes is intended to also include cycloalkenes, such as cyclohexene); unsaturated esters, such as acrylate- and methacrylate-containing monomers, such as alkyl and cycloalkyl (1 to 20 carbon atoms) acrylates and methacrylates, such as methyl methacrylate, ethyl acrylate, t-butyl acrylate, 2-ethylhexyl methacrylate, cyclohexyl acrylate and the like; vinyl acetate, vinyl propionate, vinyl butyrate, dimethyl maleate, diethyl maleate, ethyl hydrogen maleate, monoethyl fumarate and diethyl fumarate; nitriles and amides containing unsaturated groups, such as acrylonitrile, methacrylonitrile, acrylamide and methacrylamide; olefinically unsaturated carboxylic acids, such as acrylic acid, methacrylic acid, maleic acid, fumaric acid, itaconic acid and cinnamic acid; and chlorinated, fluorinated and brominated derivatives of the above.

There is the requirement, however, that the monomers used to prepare the precursor polymers of this invention contain at least about 0.5 weight percent, preferably 3 to 30 weight percent, based on total starting polymer, of one or more monomers which will result in one or more carboxylic acid groups pendant from, or terminal to, the polymer backbone, said groups being of Formula III above.

Examples of the monomers which, when polymerized into the backbone, will result in the acid groups of Formula III, include acrylic and methacrylic acids, itaconic acid, maleic acid, fumaric acid, ethyl acid maleate, cinnamic acid, crotonoic acid, 3-butenoic acid, 4-pentenoic acid, 3-pentenoic acid, 5-hexenoic acid, 4-hexenoic acid, 3-hexenoic acid, and the like.

The copolymers of this invention, then, may suitably be prepared by contacting from about 1.0 to about 80 weight percent (preferably 20 to 60 weight percent) of the above acid-containing polyalkylene copolymer in, optionally, a suitable inert solvent, with at least about 0.1 equivalents per polymeric acid equivalent (preferably 1 to 3 equivalents) of either (a) an organic ketene or (b) a carboxylic acid halide, said reaction to occur at a temperature below (preferably at least about 20° C. below) the boiling point of the simple anhydride which corresponds to the ketene or the acid halide used in the reaction.

Suitable ketenes are of the formula

wherein R' and R'' are as defined above, it being understood that the group

contains no more than about 20 total carbon atoms.

R, R' and R'' may suitably be, independently, hydrogen, alkyl, cycloalkyl, aryl, alkaryl or aralkyl groups of up to about 20 carbon atoms, and the like. Suitable alkyl and cycloalkyl groups include methyl, ethyl, isopropyl, butyl, pentyl, heptyl, 2-methyl-3,4-diethylhexyl, pentadecyl, cyclohexyl and stearyl. Suitable aryl groups include phenyl, naphthyl, and the like. Suitable alkaryl and aralkyl groups include phenethyl, diisopropylphenyl, heptylphenylpropyl and hexyloctylphenyl. Also suitable are halogenated derivatives of the above.

Suitable ketenes, then, include ketene, diphenyl ketene, dimethyl ketene, ethylbutyl ketene, diethyl ketene, phenylpropyl ketene, hexylphenyl ketene, isopropyl ketene, dibenzyl ketene, phenylethyl ketene, ethylmethyl ketene, methyl ketene, methylphenyl ketene, and the like. Preferred ketenes include ketene, dimethyl-, diethyl- and diphenyl-ketenes.

Suitable carboxylic acid halides are of the formula

wherein R is as defined above, and X is Cl, Br or I, and preferably Cl.

Suitable acid halides include the chlorides, bromides and iodides of, for example, the following acids: acetic, propionic, butyric, valeric, capric, myristic, oleic, benzoic, naphthoic, toluic, and the like. Preferred acids are the $C_2$ to $C_4$ alkanoic acids, such as acetic, propionic and butyric. It is to be noted that further halogenation of the above acids does not deter their effect in this reaction. Also, acids containing the group of Formula II may be utilized.

The preferred copolymers of this invention include those which are prepared from (1) either ketene, dimethyl-, diethyl- or diphenyl-ketenes, or acetic, propionic or butyric acid chlorides, and (2) precursor polymers of the formula $A_{(40\ to\ 98\%)}B_{(0\ to\ 40\%)}C_{(2\ to\ 50\%)}$, and A, B and C being in any order, wherein A is ethylene, B is propylene, and C is one or more unsaturated, carboxylic acid-containing monomers. All percents are by weight of the total polymer, and the legend for the symbols used follows.

More preferred polymers include (1) E (90–98%)-A.A.A. (2–10%)
(2) E (65–82%)-P (0–10%)-A.A.A. (18–25%)
(3) E (75–93%)-P (0–10%)-A.A.A. (7–15%)
(4) E (88–98%)-M.A.A. (2–12%)
(5) E (65–82%)-P (0–10%)-M.A.A. (18–25%)
(6) E (75–93%)-P (0–10%)-M.A.A. (7–15%)

E=ethylene
P=propylene
A.A.A.=acrylic acetic anhydride
M.A.A.=methacrylic acetic anhydride Solvents which are suitable in this invention include chlorinated hydrocarbon solvents, such as 1,1,1-trichloroethane, perchloroethylene, ethylene dichloride, methylene chloride, o-dichlorobenzene and the like; other organic solvents, such as benzene, toluene, dioxane, xylene, heptane and higher aliphatics; alkyl acetates, tetrahydrofuran; fluorohalocarbons, such as trichlorofluoromethane, trifluorotrichloroethane, dibromotetrafluoroethane, tetrachlorodifluoroethane and those fluorohalocarbons which are suitable for use herein for aerosol applications; and mixtures of the above.

Pressure is not a critical variable in the process of this invention, and may suitably be sub-, super- or atmospheric.

The copolymer of this invention may suitably be cured by heating, either in solution or in concentrate form, to a temperature at or above the boiling point of the simple anhydride corresponding to the ketene or the acid halide utilized in producing the polymer.

The cross-linked, or cured, product is extremely solvent resistant, no apparent solubilizing effects having been observed after several hours of refluxing one such polymer with toluene.

A continuous or non-continuous film may be formed from the polymers taught herein by treating a non-reactive substrate in well-known ways. For instance, a substrate, such as glass, metal, or the like, may be dipped into, sprayed or otherwise treated with a solution of or a concentrate of the polymer, the excess solvent, if any, removed, and the polymer cross-linked by a brief thermal cure (at or slightly above the boiling point of the corresponding simple anhydride for about 3 minutes, for instance).

The mixed anhydride polymers of this invention find further utility as additives for oil- and water-repellent agents, such as fluorocarbons, resulting in a synergistic improvement in oil- and/or water-repellency. Textiles to which such properties may be imparted include cotton, wool, cotton-wool blends, Dacron, rayon, nylon, silk, and the like.

The textile is impregnated, for instance by spraying, dipping, padding, etc., with (a) a co-application of the repellent and the polymers taught herein or (b) first with the polymer and then the repellent, the application in either case being in a solvent such as those named above or the like. The excess solvent is then removed by evaporation, using heat and gaseous flow to accelerate evaporation if desired. The impregnated textile is then subjected to a brief thermal cure, such as 3 minutes at 150° C., to cause cross-linking.

A textile so treated shows far better water- and/or oil-repellency than one treated with the repellent alone, even when using as little as 0.5 weight percent pickup of the compounds of this invention, thereby permitting the desired effect on the textile with much less of the expensive repellent. For further details, see co-pending application Ser. No. 10,008, entitled "Process and Composition for Water- and Oil-Proofing Textiles," filed concurrently herewith.

SPECIFIC EMBODIMENTS

Example 1

A 6.7 weight percent solution of ethylene-propylene-acrylic acid grease (61.6 weight percent ethylene, 21.7 weight percent propylene, 17.6 weight percent acrylic acid; molecular weight=1650) in benzene was reacted with an 80% excess (2:1 molar ratio of ketene to polymeric acid) of diphenyl ketene at 27° C. for 120 minutes. The color of the solution (orange due to diphenyl ketene) faded rapidly.

The resulting soluble grease was found by infrared analysis to contain diphenylacetic mixed anhydride groups. No by-products were observed and no purification of the solution prior to use was necessary.

Example 2

A number of mixed anhydride-containing polymers were prepared via a ketene or an acid halide by a general procedure as follows:

(A) An acid-containing polymer was disolved in an inert, anhydrous organic solvent;
(B) An equivalent amount or less of an organic ketene or acid halide was added as a gas or liquid; and
(C) The reaction was allowed to go to completion (generally 1-3 hours) with agitation and heat (as limited above).

The nature of the precursor polymer (the types of monomers used and their weight percent in the polymer), the molecular weight of the precursor polymer, the ketene or acid halide used, the equivalents of ketene or halide utilized per polymeric acid equivalent, and the weight percent of the total polymer which is represented by mixed anhydride functions after reaction are all given in the table.

solution of an olefin/carboxylic acid copolymer containing at least one group of the formula $$HO-\overset{O}{\underset{\|}{C}}-B$$

with at least about 0.1 equivalent per polymeric acid equivalent of an organic ketene of the formula $$\begin{array}{c} R' \\ \phantom{R}\diagdown \\ \phantom{RR}C=C=O \\ \phantom{R}\diagup \\ R'' \end{array}$$

wherein, in the above formulas, R, R' and R'' are, independently, hydrogen or alkyl, cycloalkyl, aryl, aralkyl or alkaryl groups of up to about 20 carbon atoms, the group $$\begin{array}{c} R' \\ \phantom{R}\diagdown \\ \phantom{RR}C= \\ \phantom{R}\diagup \\ R'' \end{array}$$

containing no more than about 20 total carbon atoms, and B is a segment of the polyalkylene chain.

| | Precursor copolymer | | | | | Other reagent | | |
|---|---|---|---|---|---|---|---|---|
| | | | Other | | | | | wt. percent, |
| No. | Ethylene, wt. percent | Propylene, wt. percent | Type | wt. percent | Total, mol. wt. | Type | Eq./ acid eq. | anhydride in product |
| 1 | 79 | 0 | Methacrylic acid | 21 | 840 | Diphenyl ketene | 0.66 | 11.0 |
| 2 | 61.6 | 21.7 | Acrylic acid | 16.7 | 1,650 | do | 0.32 | 13.5 |
| 3 | 96.2 | 0 | do | 3.8 | 145,000 | do | 6.30 | 14.0 |
| 4 | 76 | 0 | do | 24 | 1,730 | Acetyl chloride | | 24.0 |
| 5 | 53 | 17 | do | 16 | 1,720 | Butyryl chloride | | 16.0 |
| 6 | 95 | 0 | do | 5 | 150,000 | Acetyl chloride | | |
| 7 | 43 | 0 | Methacrylic acid | *57 | 1,124 | Propionyl chloride | | |
| 8 | 75 | 3 | do | 22 | 2,120 | Acetyl chloride | | 22.0 |

* 68 weight percent converted to methyl methacrylate.

Example 3

A set of 1" x 1" samples of aluminum and copper foils are degreased with trichloroethane. They are then dipped into a trichloroethane solution of the anhydride-containing polymer of Example 1 (3% by weight). The solvent is then evaporated under a heat lamp to deposit a polymer film on the samples. The coated samples are then heat cured for 3 minutes at about 220° C. to complete the cross-linking of the polymer.

Next the treated samples are contacted with concentrated HCl (38%), and with 5 N HCl. The resistance of the metals to the acids is greatly improved. The film, which is transparent, is also solvent resistant.

I claim:
1. A process for preparing a polyalkylene copolymer which contains at least one group of the formula

$$R-\overset{O}{\underset{\|}{C}}-O-\overset{O}{\underset{\|}{C}}-B$$

which comprises contacting, at a temperature below the boiling point of the simple anhydride which corresponds to the ketene utilized, a 1.0 to about 80 weight percent 2. The process of claim 1 wherein the polymer has a concentration in the solution of from 20 to 60 weight percent.

3. The process of claim 1 wherein the reaction temperature is at least about 20° C. below the boiling point of the anhydride.

4. The process of claim 1 wherein 1 to 3 ketene equivalents are utilized.

5. The process of claim 1 wherein the ketene is ketene, dimethyl-, diethyl- or diphenyl-ketene.

References Cited
UNITED STATES PATENTS 3,523,930    8/1970    Maloney    260—80.8
3,548,408    12/1970    Worrall    260—78.4

JOSEPH L. SCHOFER, Primary Examiner

J. KIGHT III, Assistant Examiner

U.S. Cl. X.R.

8—115.5, 120, 127.5, 128 R; 117—161; 260—80.3 R, 80.8